Aug. 18, 1931.  C. A. DE GIERS  1,818,973
FLOAT ARM SEAL
Filed July 10, 1929
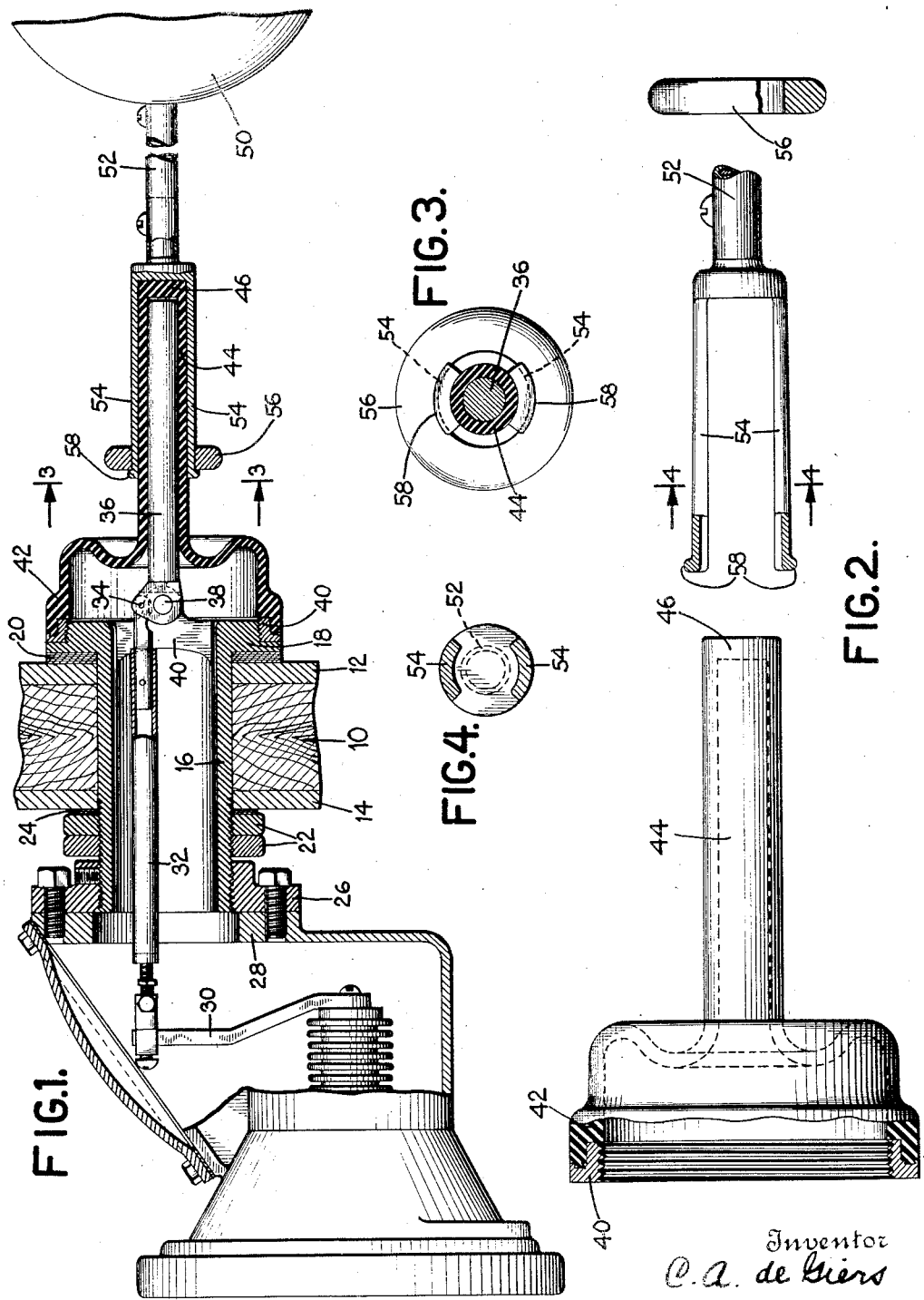

Patented Aug. 18, 1931

1,818,973

UNITED STATES PATENT OFFICE

CLARENCE A. DE GIERS, OF FOREST HILLS, NEW YORK, ASSIGNOR TO LIQUIDOMETER CORPORATION, OF LONG ISLAND CITY, NEW YORK, A CORPORATION OF DELAWARE

FLOAT ARM SEAL

Application filed July 10, 1929. Serial No. 377,089.

In the use of liquid level gauges having a float within a tank and an indicator on the outside of the tank, it is sometimes advisable or even necessary to seal the indicating apparatus from contact with material in the tank, and to so design the sealing device that it and the float may be easily cleanable so as to afford no opportunities for the breeding of bacteria. Provisions such as the above are necessary when the gauge is applied to a tank containing such liquids as milk.

The principal object of this invention, therefore, is to provide means for interconnecting the float arm and indicating mechanism in such manner that the indicating mechanism is sealed against the tank contents, the sealing device being flexible so as to permit proper action of the float arm, and the float arm being readily detachable therefrom for cleaning purposes.

Furthermore, the seal and arm securing devices are free from creases, grooves, or pockets, and therefore readily cleanable.

Further and other objects and advantages will be apparent from the specification and claims, and from the drawings which illustrate what is now considered the preferred embodiment of the invention.

Fig. 1 is a cross section showing the invention in connection with an indicator attached to the side of a milk tank.

Fig. 2 is an exploded view of the seal, the float arm clamp, and the clamping ring.

Fig. 3 is an enlarged cross section on the line 3—3 of Fig. 1.

Fig. 4 is a cross section on the line 4—4 of Fig. 2.

The wall 10 of the tank is of wood, with metal facings 12 and 14 on inside and outside respectively. A metal sleeve 16 having a head 18 is slipped through a hole in the tank wall, with packing 20 between head and wall. Sleeve 16 is held in position by clamping nuts 22 on the outside of the tank, with packing 24 between nuts and tank.

On the protruding threaded end of sleeve 16 is a flange 26 and to this flange is bolted the body 28 of the level indicator. The indicator, which forms no part of this invention, is operated by arm 30 through the instrumentality of horizontal link 32 which serves to connect arm 30 to crank pin 34 on the inner end of the shank 36 which is pivoted on pin 38 in bracket 40 supported at the inner end of sleeve 16. It will be apparent that movement of shank 36 about its pivot 38 will move link 32 horizontally to actuate the indicator through arm 30.

Threaded onto the inner side of flange 18 is a metallic ring 40 to which is vulcanized the bell shaped end 42 of a rubber sealing device, the other end of which is of tubular shape as at 44 with a bore of proper diameter to fit snugly over shank 36 and with a head 46 to close the end of the tube.

With the rubber seal in place the contents of the tank are held out of all contact with shank 36 or any of the operative parts of the indicator, and the flexible bell 42 does not interfere with movement of the shank about its pivot.

In order to operatively connect the float 50 with shank 36, the float arm 52 is provided at its end with a pair of long jaws 54 arcuate in cross section, and a clamping ring 56 of proper internal diameter to slide along the outside of the jaws and securely clamp them to the resilient sleeve 44 with shank 36 inside thereof. Beads 58 serve to prevent passage of ring 56 over the free ends of the jaws.

By the above means the float is instantly detachable from the indicator and, when so detached, as in Fig. 2, all parts likely to come in contact with the tank contents are readily cleanable. After cleaning they may be instantly reassembled in operative relationship as in Fig. 1.

It is to be understood that the invention is not limited to the specific construction herein described, but may be used in other ways without departure from its spirit as defined by the following claims.

I claim—

1. In apparatus of the class described, in combination, a tank adapted to contain liquid, a float adapted to rest on the liquid, an indicating device on the outside wall of the tank, and means for operatively interconnecting said float and said device, said interconnecting means including a shank, a float arm, jaws on said float arm and a ring for locking said jaws to said shank, substantially as described.

2. The invention set forth in claim 1 in which a resilient sleeve is interposed between said jaws and said shank.

3. The invention set forth in claim 1 in which a resilient sleeve is interposed between said jaws and said shank, said sleeve serving as a seal to prevent contact of the tank contents and said indicating device.

4. In apparatus of the class described, in combination, a tank adapted to contain liquid, a float adapted to rest on the liquid, pivoted means for supporting said float and sealing device interconnecting said supporting means and the wall of the tank whereby access of the tank contents to the space between seal and wall is prevented.

5. The invention set forth in claim 4 in which said sealing device includes a flexible bell-like portion adjacent the tank wall.

6. The invention set forth in claim 4 in which said sealing device is provided with a surface adapted for easy and complete cleansing, for the purpose set forth.

7. In apparatus of the class described, in combination, a tank adapted to contain liquid, a float adapted to rest on the liquid, a pivoted shank for supporting said float, and a sealing device interconnecting said shank and the wall of the tank, said device comprising a tubular portion enclosing said shank, and a bell-like portion engaging the tank wall, for the purpose set forth.

8. The invention set forth in claim 7 in which clamping means is provided for engaging said tubular portion of the seal for securing said float to said seal.

9. The invention set forth in claim 7 in which clamping means is provided for engaging said tubular portion of the seal for securing said float to said seal, said clamping means comprising jaws and a ring slidable along said jaws for causing them to clamp said tubular portion.

10. In apparatus of the class described, in combination, a tank adapted to contain liquid, pivoted means for supporting a float within the tank, and a flexible rubber seal attached to the wall of the tank and enclosing said supporting means for sealing said supporting means from the tank contents.

11. The invention set forth in claim 10 in which said rubber seal comprises a bell-like portion for attaching to the wall, and a tubular portion for snugly engaging said supporting means.

12. In apparatus of the class described, in combination, a tank adapted to contain a liquid, a metallic sleeve forming an opening through the tank wall, a pivoted float-supporting member within the tank, a gauge mounted on the outside end of said sleeve, means passing through said sleeve and connecting said pivoted member and said gauge whereby said gauge indicates the position of said pivoted member, and a flexible bell-like seal engaging said sleeve and said pivoted member for preventing access of the tank contents to said pivoted member and said sleeve, substantially as described.

13. The invention set forth in claim 12 in which said engaging means comprises a metal ring threaded to said sleeve and vulcanized to said seal.

In testimony whereof I hereto affix my signature.

CLARENCE A. DE GIERS.